Aug. 13, 1940.    A. E. MAYNARD    2,211,067
CUTTING DEVICE
Filed Dec. 17, 1937    5 Sheets-Sheet 1
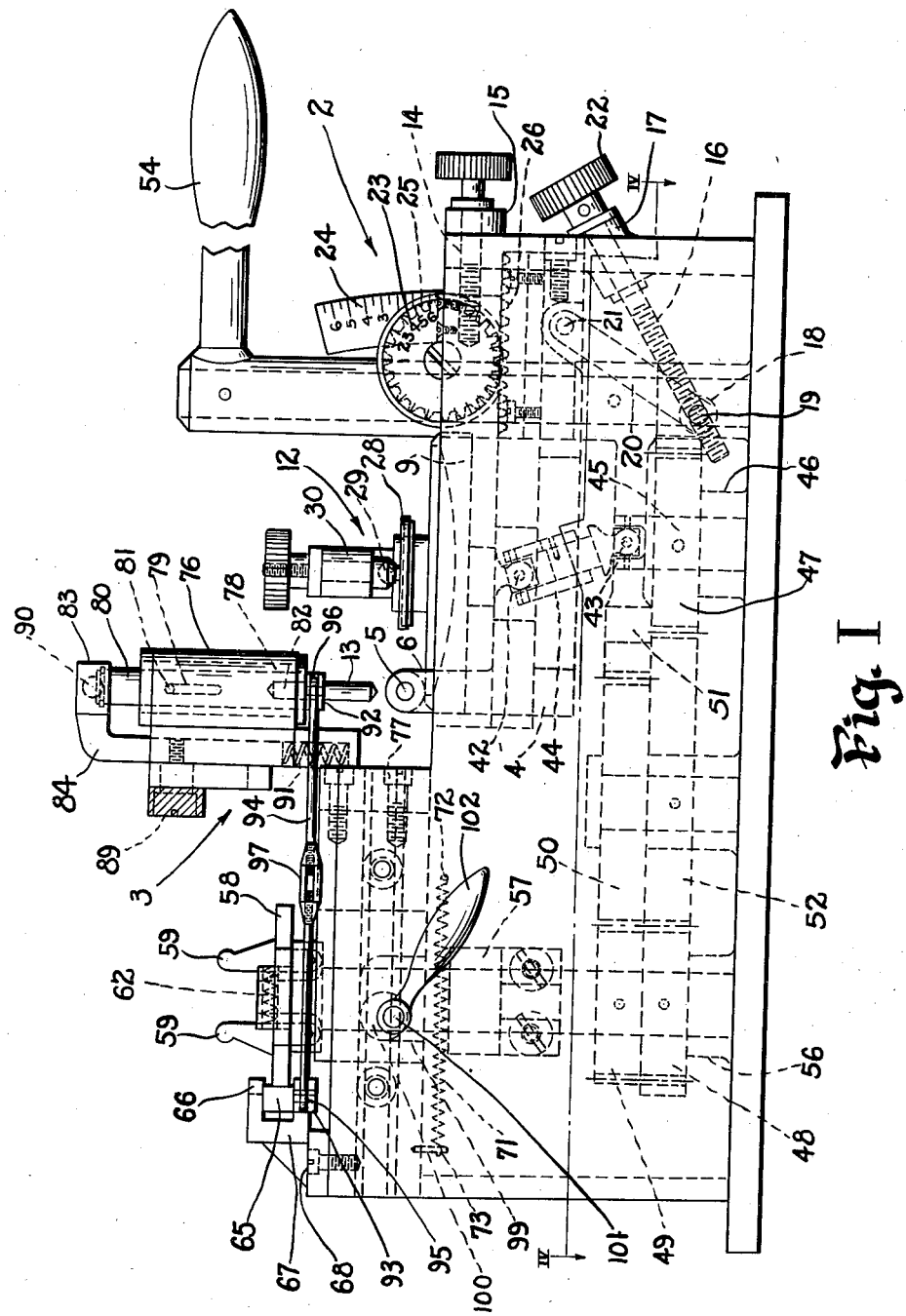
Fig. I
INVENTOR
ALBERT E. MAYNARD.
BY
Harry H. Styll
ATTORNEY

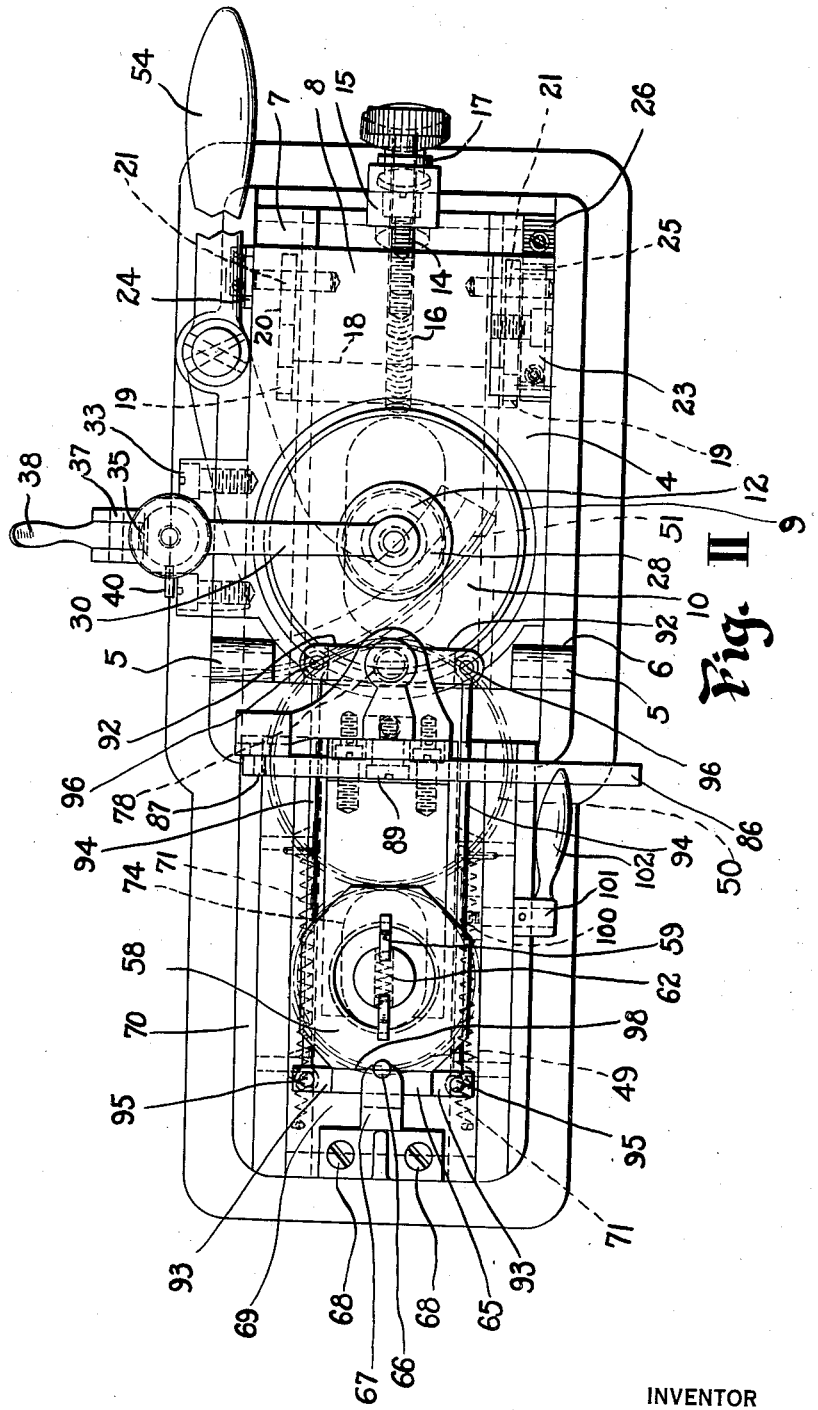

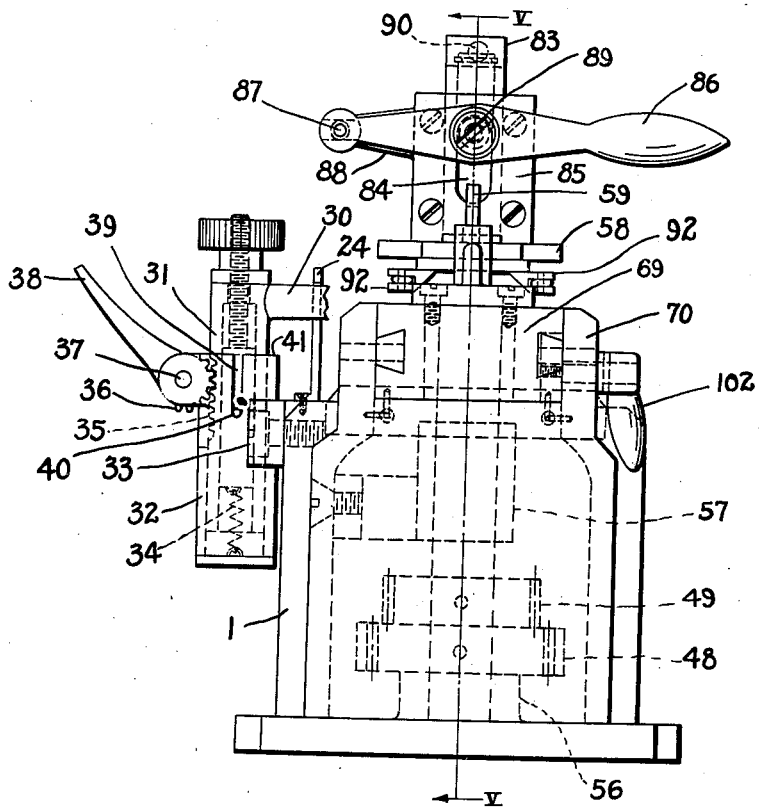
Fig. III

Aug. 13, 1940.   A. E. MAYNARD   2,211,067
CUTTING DEVICE
Filed Dec. 17, 1937   5 Sheets-Sheet 4
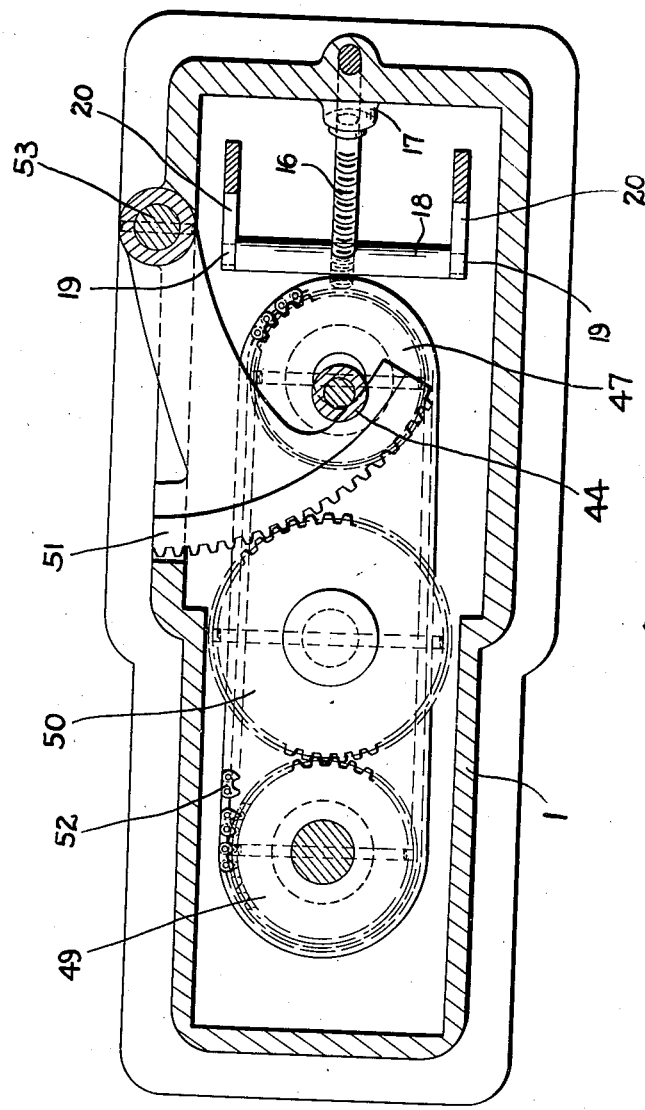
INVENTOR
ALBERT E. MAYNARD.
BY
Harry H. Styll
ATTORNEY

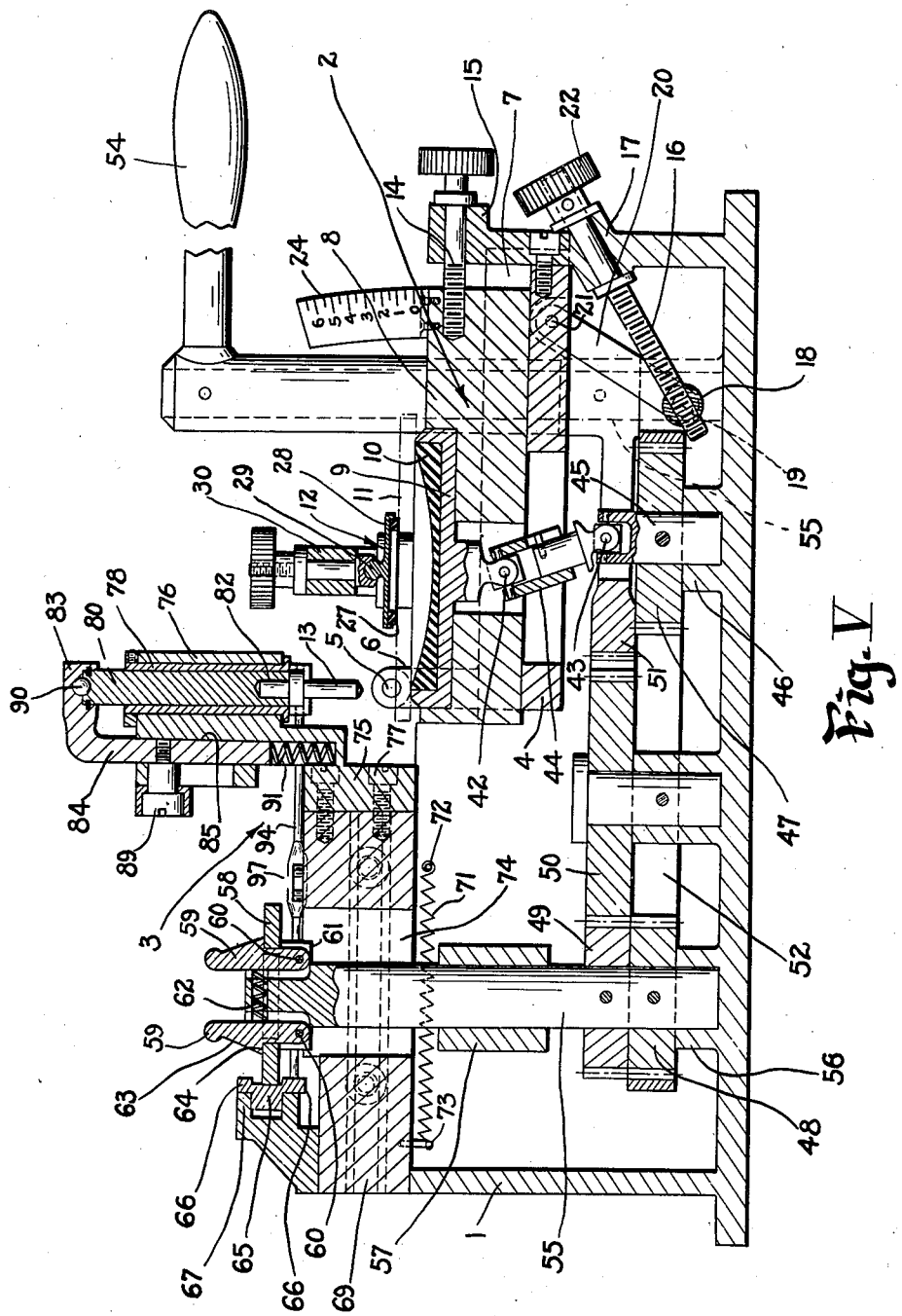

Patented Aug. 13, 1940

2,211,067

UNITED STATES PATENT OFFICE 2,211,067

CUTTING DEVICE

Albert E. Maynard, Southbridge, Mass., assignor to American Optical Company, Southbridge, Mass., a voluntary association of Massachusetts Application December 17, 1937, Serial No. 180,427

4 Claims. (Cl. 33—28)

This invention relates to improvements in cutting devices and has particular reference to a novel and improved construction of machine particularly adapted for the cutting of ophthalmic lenses or similar articles having irregular contour shapes.

One of the principal objects of the invention is the provision of an improved construction of machine particularly adapted for cutting either flat, concave or convex surfaces which may be readily set to cause the cutting point to be presented in the proper manner to such different surfaces in order that a clean cut may be obtained.

Another object of the invention is to provide a machine of the above character wherein access to the work holding table is readily obtainable and the patterns controlling the shape of the cut may be easily interchanged.

Another object of the invention is to provide a machine of the above character wherein the extent of the cut is controlled.

Another object is to provide a device of the above character in which maximum rigidity of the parts when in adjusted position is attained and wherein the cutting means will have a smooth and positive movement.

Another object is to provide a novel and improved arrangement for guiding the cutting tool in a given path over the work and for simultaneously turning the cutting tool so as to maintain its cutting edge in the direction of movement thereof over the work.

Another object is to provide a novel and improved arrangement for controlling the angle at which the work is disposed relative to the cutting tool and for controlling the resultant dimensions of the work.

Other objects and advantages of the invention should be readily apparent by reference to the following specification taken in connection with the accompanying drawings, and it will be understood that many changes may be made in the specific details of construction shown and described without departing from the spirit of the invention as expressed in the accompanying claims. I, therefore, do not wish to be limited to the exact details of construction and arrangement of parts shown and described as the preferred form only has been set forth by way of illustration.

It is essential, in cutting ophthalmic lenses, that the said lenses be positively supported during the cutting, so that the positional elements of the resulting lens will be in their desired locations with respect to the position at which the lenses are thereafter supported before the eyes. Some of these positional elements must be very carefully controlled in order to obtain the resultant prescriptive correction desired. It is essential, therefore, that the lens be properly located in the cutting device prior to cutting. One of these positional elements which must be carefully controlled is the location or position of the axes of cylindrical or prismatic lenses. The position of the optical centers, height of segments of bifocals, etc., must also be controlled during the cutting and edging operations performed on the lenses. In the past, much difficulty has been encountered in accurately locating the lenses in the holders or lens supports of such cutting devices. This was due mostly to the fact that with most prior art constructions direct and full vision of the lens on the supporting table was not possible.

It, therefore, is one of the primary objects of this invention to provide an arrangement whereby full vision of the lens supporting table is possible so that the lenses may be properly and accurately positioned thereon.

Another difficulty with many prior art devices of this character was in providing means whereby the cutting tool could be angled relative to the work or lenses so that lenses having flat, concave or convex surfaces could be presented to the tool in such a manner that a clean and positive cut could be obtained. Many of these prior art devices embodied swivel joints or the like, tilted by contact with a finished surface of the lens. This involved difficulty in properly and rigidly holding the parts in desired and positive relation with each other and of preventing the highly polished optical surfaces of the lenses from becoming scratched or marred during the cutting operation.

A further object therefore, is the provision of a novel arrangement whereby the cutting tool and lens may be angled relative to each other to control the angle of cut and may also be guided relative to each other during the cutting operation to maintain the cutting edge of the tool in the direction of the cut without injury to the lens.

Referring to the drawings:

Fig. I is a side elevation of the device embodying the invention;

Fig. II is a plan view of Fig. I;

Fig. III is an end view of Fig. I;

Fig. IV is a sectional view taken as on line IV—IV of Fig. I; and

Fig. V is a sectional view taken as on line V—V of Fig. III.

Referring more particularly to the drawings wherein like characters of reference designate like parts throughout the several views, the device embodying the invention comprises broadly a base 1 having work supporting means 2 adjacent one end and cutting mechanism 3 adjacent its opposite end.

The work supporting means 2 comprises a bracket 4 pivotally connected at 5 to suitable pivot supports 6 on the base 1. The bracket 4, as shown in Figs. II and V, has a slideway 7 in which is mounted a slide 8 carrying the work holding table 9. The table 9 is provided with a suitable cushion member 10 of rubber, felt, leather or other suitable means on which the work 11, indicated by the dot and dash lines in Fig. V, is rested and held by suitable clamp means 12. The table 9 supporting the work 11 may be moved in and out relative to the cutting tool 13 by means of an adjusting screw 14 threadedly connected adjacent one end thereof to the slide 8 and rotatably supported adjacent its opposite end in a bearing 15 on the bracket 4. This adjustment is for the purpose of controlling the resultant size of the work.

The table 9 supporting the work 11 may be tilted relative to the cutting tool 13 by means of a threaded adjusting screw 16 supported in a bearing 17 formed in the base 1. The screw 16 extends within a threaded opening in a bar 18 pivotally connected adjacent its opposed ends 19 to suitable links 20 which are in turn pivotally connected at 21 to the bracket 4. When the screw is rotated by means of the thumbpiece 22, the bar 18 is moved longitudinally of said screw and in turn imparts motion to the link members 20 which cause the bracket 4 supporting the table 9 to be moved about its pivots 5 and thereby angle the said table and the work carried thereby as desired.

The resultant size of the work or lens being cut is controlled by the in and out movement of the table 9 with the slide 8 and is controlled by suitable scale and indicator means 23. The indicator means 23 is provided with a suitable gear member 25 cooperating with a rack 26 carried by the slide 8 which causes the said indicator means to move with corresponding movements of said slide. Suitable scale means 24 is provided for determining the angular position of the work or lens relative to the cutting tool 13. This scale means cooperates with a suitable indicator carried by the base (not shown).

The clamp 12 for holding the work 11 on the table 9 has a cushion bearing portion 27 supported in a holder 28 universally attached at 29 to a clamp arm 30. The arm 30 has a support 31, see Fig. III, extending within a bearing 32 secured to the base 1 by means of connecting screws, or the like, 33. The support 31 is slidable in the bearing 32 and is normally urged longitudinally of said bearing by means of a spring, or the like, 34, which causes the clamp to be urged toward the work supporting table 9 to clamp the work 11 thereon. The suport 31 is provided with a toothed rack section 35 in mesh with a gear sector 36 pivotally supported at 37 on the bearing 32. The gear sector 36 is provided with a handle 38, rotation of which causes the gear sector meshing with the rack 35 to raise the support 31 in the bearing 32 and thereby lift the clamp from engagement with the work. The bearing 32 is provided with a longitudinally extending slot 39 in which a pin 40 carried by the support 31 is fitted and which imparts a straight line movement to the clamp means 12 when the said clamp is moved toward or away from the table 9. The pin 40 also functions as means for holding the clamp in raised position by movement thereof out of the slot 39 into engagement with the end surface 41 of the bearing 32. This is brought about by lifting the support 31 until the pin 40 is moved outwardly of the slot 39 and by thereafter rotating the support 31 to move the pin 40 to a position overlying the surface 41.

The table 9 is rotatably supported in the bearing 8 so that the work supported by said table may be rotated relative to the cutting tool 13. To make possible the rotation of said table and to permit the tilting of said table and movement thereof in and out relative to the cutting tool 13, the said table is provided with universal connections 42 and 43 with a telescopic shaft 44 and stub-shaft 45. The shaft 45 is rotatably supported in a well type bearing 46 and has a gear member 47 secured thereto. Rotation of the gear member 47 will thereby cause the table 9 to be rotated regardless of its angular position or in and out movement relative to the cutting tool 13. Movement is imparted to said gear member 47 through the train of gears 48, 49 and 50, gear sector 51, and through the gear belt 52. The gear sector 51, shown in Figs. IV and V, is pivotally supported on a shaft 53, adapted to be rotated by means of a handle 54. Movement of the gear sector 51 causes the gear 50 to be rotated substantially one cycle of movement throughout the length of movement of the gear sector 51. The gear 50, meshing with the gear 49 carried by the shaft 55, will cause the said shaft to be rotated and impart movement to the gear 48 also carried by said shaft, and through the gear belt 52, causes the gear 47 and table 9 to be rotated. The shafts 45 and 55 will thereby be simultaneously rotated equal amounts. The shaft 55 is supported in spaced bearings 56 and 57 and is adapted to support a former 58 of the shape desired to be cut from the work or lens blank 11. The former 58 is secured to the shaft 55 adjacent the upper end thereof by spring pressed fingers 59 pivoted at 60 to an enlarged head 61 formed on said shaft and which are urged by the spring member 62 into engagement with an inner slotted portion of the former 58. The fingers 59 are provided with tapered portions 63 which cause the said fingers to cam inwardly when the former 58 is placed thereon and pressed toward the enlarged head 61, and are provided adjacent the lower ends of the cam surfaces 63 with shouldered portions 64, which are adapted to be forced outwardly by the spring member 62 to grip the former 58 and hold it on the head 61. The former 58 is so held by the spring pressed fingers 59 as to rotate with the rotation of the shaft 55. During the rotation of said former 58 a shoe 65 pivotally supported at its opposed ends 66 in a bearing support 67 is adapted to engage the peripheral edge of said former. The bearing support 67 is secured by means of screws or the like 68 to a slide 69 mounted in a slideway 70 formed on the base 1. (See Figs. I, II, III and V.)

The contact shoe 65, carried by the slide 69, is constantly urged into engagement with the former 58 by means of spring members 71 secured adjacent one end 72 thereof to the base 1 and their opposite ends 73 to the slide 69. The slide 69 is provided with an opening 74 through which the shaft 55 extends and which permits movement of the slide 69 in a direction transversely of the axis of the shaft 55.

A bracket 75 carrying a bearing 76 is secured to the end of the slide 69 opposite the bearing support 67 by means of the screws or the like 77. The bearing 76 has a sleeve 78 rotatably supported therein. The sleeve 78 has a slot 79 extending in a direction longitudinally thereof and slidably supports a tool holding shaft 80 therein. The shaft 80 is held against rotation relative to the sleeve 78 by means of a pin member 81 which extends within and moves longitudinally of the slot 79 when the shaft 80 is slid longitudinally of the sleeve 78. The cutting tool 13, which may be a diamond, steel roll, or other means known in the art, is secured in a chuck-like holding end 82 of the shaft 80. The upper end of the shaft 80 is secured within an angled head 83 formed on a slide member 84 mounted in a slideway 85 formed in the bracket 75. The slide 84 is moved longitudinally of the slideway 85 by means of a lever 86 pivoted at 87 to a support 88 formed on the bracket and connected at 89 to the slide 84. Downward pressure on the lever 86 causes the slide 84 to move downwardly and, through its connection with the shaft 80, the angled head 83 causes said shaft and cutting tool to be moved downwardly. A ball bearing, or the like, 90, is positioned between the inner adjacent surface of the angled head 83 and the upper end of the shaft 80 to provide free turning of said shaft 80 in said head.

The slide 84 is normally urged upwardly by a spring member 91 so that movement of said slide in a downward direction, through the lever 86, depresses the spring 91 so that when pressure is released on the lever, said spring 91 will tend to return to its initial set and move the slide 84 and cutting tool 13 upwardly away from the work. To cause the cutting tool 13 to have its cutting edge maintained in the direction of the cut being formed on the work, the said tool is turned slightly during the cutting operation. This turning is brought about by providing the sleeve 78 with opposed projections 92 and by providing similar projections 93 on the contact shoe 65. The respective projections 92 and 93 on the opposite sides of said sleeve 78 and contact shoe 65 are connected by tie rods 94 pivotally attached adjacent their opposite ends, as illustrated at 95 and 96, to said projections. Suitable turn buckles 97 are provided intermediate the ends of said rods 94 to permit lengthening and shortening thereof. The contact shoe 65 is provided with a relatively flat former engaging surface 98 which during rotation of the former 58 will cause the said contact shoe to be tilted, in following the contour shape of the former 58, about its pivots 66, and, through the tie rod connections 94 with the opposed projections 92 on the sleeve 78, will cause said sleeve to be rotated in the bearing 76. The pin and slot connection 79 and 81, between the sleeve 78 and shaft 80, will thereby cause the said shaft 80 to be turned simultaneously to the turning of the sleeve 78. This, thereby, causes the cutting tool 13 to be turned so that the cutting edge thereof will follow in the direction of the cut which is being made in the work or lens blank 11, and will also cause the tool to be simultaneously moved in and out, with the slide 69 supported in the slideway 70, amounts controlled by the contour shape of the former 58 as it is rotated.

The operation of the machine is substantially as follows: The lens to be cut and having suitable axis indicating and center locating marks thereon is placed on the table 9 of the machine. The face of the table 9, or pad 10 on said table, is provided with suitable aligning means with which the axis indicating and center locating markings on the lens are aligned. The clamp 12 is then moved into position over the lens wherein it will be urged under the action of the resilient means 34 into contact with the lens and hold the same on the table 9. If the lens is concave—convex in shape and the concave surface is to be presented to the cutting tool 13, the table 9 will be tilted upwardly above the pivots 5 an amount to be determined by the concave curvature of the lens. The amount of this tilting in most instances is enough to locate the surface of the lens adjacent the cutting tool in substantially normal relation with the axis of the tool. If the convex surface is presented to the tool, the table 9 is tilted downwardly about the pivots 5 until the surface adjacent the cutting tool is substantially normal to the axis of the cutting tool. The amount of said tilting, of course, depends upon the convex curvature and can be positively controlled and set to the desired angle by reference to the scale and indicator means 24. After the angle has been properly adjusted, the slide 8, carrying the table 9, is then adjusted through readings taken from the scale and indicator means 23 to the setting required to obtain the size desired. This is obtained by altering the distance between the axis of the lens and the axis of the cutting tool. After the lens has been properly located and angled relative to the cutting tool and the desired former shape 58 has been positioned on the head 61 of the shaft 55, pressure is applied to the lever 86 to move the cutting tool 13 downwardly into engagement with the surface of the lens. The handle 54 is then grasped by the operator and is given one-quarter turn to cause the gear sector 51 to rotate the train of gears 49 and 50, etc., and impart one complete rotation simultaneously to the lens supporting table and former 58. During the simultaneous rotation of the lens former 58 and table 9, the pressure on the lever 86 is varied according to the contour of the lens by the operator so as to form the desired cut in the lens. As the cut is being formed, the former 58 causes the cutting tool 13 and slide 69, which carries said tool, to be moved longitudinally of the slide 70 under the guidance of the contour edge of the former to cause the cut to assume the same shape as said former and simultaneous to this function, the tool 13 is turned so that its cutting edge will be disposed in the direction of the cut.

For ease in interchanging formers 58 the slide 69 is provided with a recess 99 in which is mounted a cam 100. The cam 100 is mounted on a shaft 101 and is rotated by means of a main lever 102 also mounted on said shaft. The cam is so formed that when rotated the high portion thereof engages a side wall of the recessed portion 99 and forces the slide 69 outwardly against the action of the resilient means 71 to force the cam shoe 65 away from the former 58 and hold the same in this position. When rotated in the opposite direction, the cam 100 is moved clear of the side walls of the recess to permit free reciprocating movement of the slide 69 in the slideway 70 so that the said slide will be free to follow the contour of the former 58.

The purpose of adjusting the tie rods 94 by rotation of the turn buckles 97 to shorten or lengthen said rods, as previously mentioned above, is to provide adjustable means whereby the angle of the cutting tool 13 may be varied to compensate for departures thereof from a predetermined initial set. This adjustment is primarily used when the cutting tools are interchanged and the cutting edge thereof is not disposed in the proper direction. This obviates the having to fix the cutting tool in definite relation with its holder during the forming thereof, particularly with diamond type cutting tools, so that the diamond setter does not have to work with extreme accuracy in setting up the diamonds as slight departure of the angle of the cutting edge from the desired angle may be taken care of by varying the lengths of the respective tie rods by adjustment of the tie rods after the tool support has been mounted in its holder 82.

Although the face of the contact shoe has been specified as being flat it is to be understood that the face may be slightly curved or formed to any other desirable shape. The face of the shoe contacting the former is however, in all instances, positioned substantially in the plane of the axis of its pivotal support to that pivotal movement thereof in following the contour of the former will be substantially about the center of its pivotal connection 66 with the support 67.

From the foregoing description, it will be seen that all of the adjustments of the machine are positively controlled and that the formers, as well as the work, may be quickly and easily interchanged. The moving parts all have a positive function and are rigidly maintained in desired relation with each other.

With the above machine, any desired contour shape may be cut and lenses having different surface curvatures may be associated with the cutting tool as to be accurately and positively cut to the size desired.

Having described my invention, I claim:

1. In a device of the character described a work supporting table and a cutting tool adapted to engage work held on said table, means supporting said table for angular movement relative to the longitudinal axis of the tool, means for slidably adjusting said work supporting table in a direction transversely of the longitudinal axis of the tool for controlling the resultant size of the work, the said tool being mounted on a holder for longitudinal movement toward and away from the work supporting table and for sliding movement in a direction transversely of the axis of the work supporting table to permit movement of the tool toward and away from the center of said table, said holder having an opening therein, a former holder extending through said opening a contact shoe pivotally attached to said holder, a former on said former holder engaging the contact shoe and being adapted to control the sliding movement of the holder, with the said contact shoe being adapted to rock about its pivot attachment in following the contour of the former, means connecting the tool with the contact shoe to transmit the movements of said contact shoe to the tool to cause the said tool to be rotated in its support, and means for simultaneously rotating the former and work supporting table.

2. In a device of the character described a work supporting table and a cutting tool adapted to engage work held on said table, means supporting said table for angular movement relative to the longitudinal axis of the tool, means for adjusting said work supporting table in a direction transversely of the longitudinal axis of the tool for controlling the resultant size of the work, the said tool being mounted on a holder for longitudinal movement toward and away from the work supporting table and for sliding movement in a direction transversely of the axis of the work supporting table to permit movement of the tool toward and away from the center of said table, a contact shoe pivotally attached to said holder, a former engaging the contact shoe and being adapted to control the sliding movement of the holder with the said contact shoe being adapted to rock about its pivot attachment in following the contour of the former, means connecting the tool with the contact shoe to transmit the movements of said contact shoe to the tool to cause the said tool to be rotated in its support, indicating means for determining the angular relation of the work supporting table relative to the tool and the relation of the center of said table relative to the longitudinal axis of the tool and means for rotating said work supporting table and former simultaneously.

3. In a device of the character described a work supporting table carried by a base and a former support located in spaced relation with said table, a former on said former support, said base having a slideway extending transversely of the axis of the former support, a slide mounted in said slideway and having an opening therein through which the former support extends, a cutting tool carried by said slide and supported for movement toward and away from work carried by said work supporting table, a contact shoe carried by said slide, means for urging the contact shoe into engagement with the former, means connecting said contact shoe with the tool supporting portion of the slide for transferring movement of said contact shoe to the tool, means for changing the angular relation of the work supporting table and the longitudinal axis of the tool and means for rotating said work supporting table and former support simultaneously.

4. In a device of the character described a work supporting table carried by a base and a former support located in spaced relation with said table, a former on said former support, said base having a slideway extending transversely of the axis of the former support, a slide mounted in said slideway and having an opening therein through which the former support extends, a cutting tool carried by said slide and supported for movement toward and away from work carried by said work supporting table, a contact shoe carried by said slide, means for urging the contact shoe into engagement with the former, means connecting said contact shoe with the tool supporting portion of the slide for transferring movement of said contact shoe to the tool, means for changing the angular relation of the work supporting table and the longitudinal axis of the tool, means for adjusting the work supporting table to change the distance between its center and the axis of the cutting tool to control the resultant size of the work to be cut by said tool and means for rotating said work supporting table and former simultaneously.

ALBERT E. MAYNARD.